(12) United States Patent
Albrecht

(10) Patent No.: US 12,407,595 B2
(45) Date of Patent: Sep. 2, 2025

(54) METHOD OF CAPTURING PACKETS FROM APPLICATIONS HOSTED ON CONTAINERS

(71) Applicant: Siemens Aktiengesellschaft, Munich (DE)

(72) Inventor: Harald Albrecht, Nuremberg (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 18/695,556

(22) PCT Filed: Jul. 29, 2022

(86) PCT No.: PCT/EP2022/071313
§ 371 (c)(1),
(2) Date: Mar. 26, 2024

(87) PCT Pub. No.: WO2023/046340
PCT Pub. Date: Mar. 30, 2023

(65) Prior Publication Data
US 2025/0126041 A1 Apr. 17, 2025

(30) Foreign Application Priority Data
Sep. 27, 2021 (EP) .................................. 21199113

(51) Int. Cl.
*G06F 15/16* (2006.01)
*H04L 43/028* (2022.01)
(Continued)

(52) U.S. Cl.
CPC ............ *H04L 43/12* (2013.01); *H04L 43/028* (2013.01); *H04L 43/20* (2022.05)

(58) Field of Classification Search
None
See application file for complete search history.

(56) References Cited

U.S. PATENT DOCUMENTS 11,201,955 B1 * 12/2021 Sachdeva .............. H04L 67/535
2020/0019485 A1 1/2020 Moradi
(Continued)

OTHER PUBLICATIONS

PCT International Search Report and Written Opinion of International Searching Authority mailed Dec. 2, 2022 corresponding to PCT International Application No. PCT/EP2022/071313 filed Jul. 29, 2022.

*Primary Examiner* — Phuoc H Nguyen
(74) *Attorney, Agent, or Firm* — Lempia Summerfield Katz LLC

(57) ABSTRACT

A method of capturing packets from one or more applications hosted on containers connected to one or more network interfaces in a section of the industrial network by a packet capture service. The method includes receiving a capture request for capturing packets associated with a connection of a second container from the one or more containers, determining a network path associated with the connection of the second container, determining the presence of the one or more network interfaces in one of first capture session and the connection between the packet capture service and a packet capture client, and approving the capture request based on the between the packet capture service and a packet capture client for creating a second capture session for capturing packets associated with the connection of the second container.

14 Claims, 3 Drawing Sheets

(51) Int. Cl.
  *H04L 43/12* (2022.01)
  *H04L 43/20* (2022.01)

(56) References Cited

U.S. PATENT DOCUMENTS

| | | |
|---|---|---|
| 2020/0236037 A1 | 7/2020 | Shu |
| 2020/0293418 A1 | 9/2020 | Moradi |
| 2021/0367871 A1* | 11/2021 | Musa ..................... H04L 43/04 |
| 2022/0329505 A1* | 10/2022 | Malhotra ............ H04L 43/0811 |
| 2024/0244053 A1* | 7/2024 | Tian .................... H04L 63/0245 |

* cited by examiner

METHOD OF CAPTURING PACKETS FROM APPLICATIONS HOSTED ON CONTAINERS

CROSS REFERENCE TO RELATED APPLICATIONS

The present patent document is a § 371 nationalization of PCT Application Serial Number PCT/EP2022/071313, filed Jul. 29, 2022, designating the United States which is hereby incorporated in its entirety by reference. This patent document also claims the benefit of EP 21199113.8 filed on Sep. 27, 2021, which is hereby incorporated in its entirety by reference.

FIELD

Embodiments relate to containers in industrial automation including packet capture and analysis of network traffic in relation to containers.

BACKGROUND

A packet capture tool (also known as a packet sniffer or packet analyzer) is a program or special hardware that is capable of intercepting and logging packets that transmitted in a network. These packets are then used to analyze network behavior to improve network performance. With the advent of container technology, containers have been deployed in a plurality of scenarios including industrial automation. In additional a multitube of physical assets, there are a huge number of virtual assets in automation networks. These virtual assets or industrial applications are deployed and executed in huge numbers, since they are container based and are rather small and nimble. These industrial applications may run in the plant on Industrial Edges or may be executed on industrial OT clusters, where they still have direct network access to the production network. Accordingly, given the huge number of assets (both physical and virtual) in the automation network, it becomes necessary to perform network analysis to ensure network utilization is optimal. In order to perform network analysis, packets in the network are recorded for analysis. This is done by packet capture tools. Using packet capture tools, network traffic may be recorded inside and to/from an Industrial Edge device from a remote computer (also referred to as capture client), observe them live and evaluate them without delay during recording. The packets are recorded in the industrial device, but not stored there, but instead immediately transferred via a so-called web socket connection to the capture client for recording and evaluation.

For certain communication problems and paths, however, the communication between an application on the industrial device and the automation devices outside the industrial device must be recorded in particular at the physical interfaces of the industrial device in contrast to a recording purely at the virtual network interface of a container associated with the application. However, there is the problem that feedback may arise in the recording or transmission of the recorded packets: since the packets are recorded at a point in the network of the industrial device, over which these packets are subsequently transmitted as a recording stream, feedback occurs. As a result, the recording is massively inflated and not significantly reliable.

BRIEF SUMMARY AND DESCRIPTION

The scope of the embodiments is defined solely by the appended claims and is not affected to any degree by the statements within this summary. The present embodiments may obviate one or more of the drawbacks or limitations in the related art.

Embodiments provide a method of capturing packets from one or more applications hosted on one or more containers connected to one or more network interfaces in a section of the industrial network by a packet capture service. The packet capture service is connected to a packet capture client for transmitting the captured packets to the packet capture client and includes a first capture session capturing packets associated with a first container. The method includes receiving a capture request for capturing packets associated with a connection of a second container from the one or more containers, wherein the connection is between the second container and a network destination for transmitting one or more packets; determining a network path associated with the connection of the second container, wherein the network path is indicative of the one or more network interfaces used by the packets of the connection from the second container to the network destination; determining the presence of the one or more network interfaces in one of first capture session and the connection between the packet capture service and a packet capture client; and approving the capture request based on the connection between the packet capture service and a packet capture client for creating a second capture session for capturing packets associated with the connection of the second container.

Embodiments provide a method for packet capture where incoming capture requests are checked for potential overlaps in relation to network interfaces with existing capture sessions and the connection between the packet capture service and the packet capture client(s). Accordingly, the method provides that the risk of self-recording is eliminated.

In an example, the capture request is approved when the one or more network interfaces are not present in the first capture session and the connection between the packet capture service and the packet capture client. Accordingly, the capture requests when there is a possibility of self-recording is determined based on the network interfaces and are not processed further.

In an example, the method further includes generating a filter related to the capture request for capturing packets associated with the connection of the second container, when at least one network interface from the one or more network interfaces is present in the first capture session and the connection between the packet capture service and the packet capture client and wherein the filter includes one or more filter expressions for filtering one or more of packets associated with the first capture session and packets originating from the packet capture service. Accordingly, in spite of a potential overlap in the network interfaces, the method avoids the possibility of self-recording by dynamically generating a filter in order to filter packets associated with the packet capture service from being recorded by the packet capture service.

In an example, approving the capture request includes detecting a presence of a filter in relation to the one or more network interfaces, wherein the capture request is not approved when the filter is detected. Accordingly, the method allows for determining if there is a filter already associated with the network interfaces and in case such a filter is already present, a new filter may not be compatible.

In an example, the capture request is transmitted by the packet capture client and the capture request includes network information associated with the packet capture client. Accordingly, the determination of the network interfaces associated with the connection between the packet capture client and the packet capture service is determined based on the network information associated with the packet capture client. In an example, the capture request includes network information associated with the second container. Accordingly, determination of the network path including determining one or more intermediate network interfaces based on the network information associated with the second container and a network topology associated the section of industrial network.

In an example, the method further includes determining a first set of network interfaces used in the connection between the packet capture service and the packet capture client based on the network information of the packet capture client and a network topology associated with the section of the industrial network. In an example, the one or more intermediate network interfaces belong to at least one reverse proxy device. In an example, the network topology includes IP/TCP address configuration and IP route information of the one or more containers and the one or more network interfaces.

In another aspect, embodiments provide a packet capture device for capturing packets from one or more containers connected to one or more network interfaces in a section of the industrial network. The packet capture device is connected to a packet capture client for transmitting the captured packets to the packet capture client and includes a first capture session capturing packets associated with a first container. The packet capture device includes one or more processors configured to receive a capture request for capturing packets associated with a connection of a second container from the one or more containers, wherein the connection is between the second container and a network destination for transmitting one or more packets; determine a network path associated with the connection of the second container, wherein the network path is indicative of the one or more network interfaces used by the packets of the connection from the second container to the network destination; determine the presence of the one or more network interfaces in one of first capture session and the connection between the packet capture service and a packet capture client; and approve the capture request based on the presence of the one or more network interfaces in one of first capture session and a connection between the packet capture service and a packet capture client for creating a second capture session for capturing packets associated with the connection of the second container.

DETAILED DESCRIPTION

Figure 1:
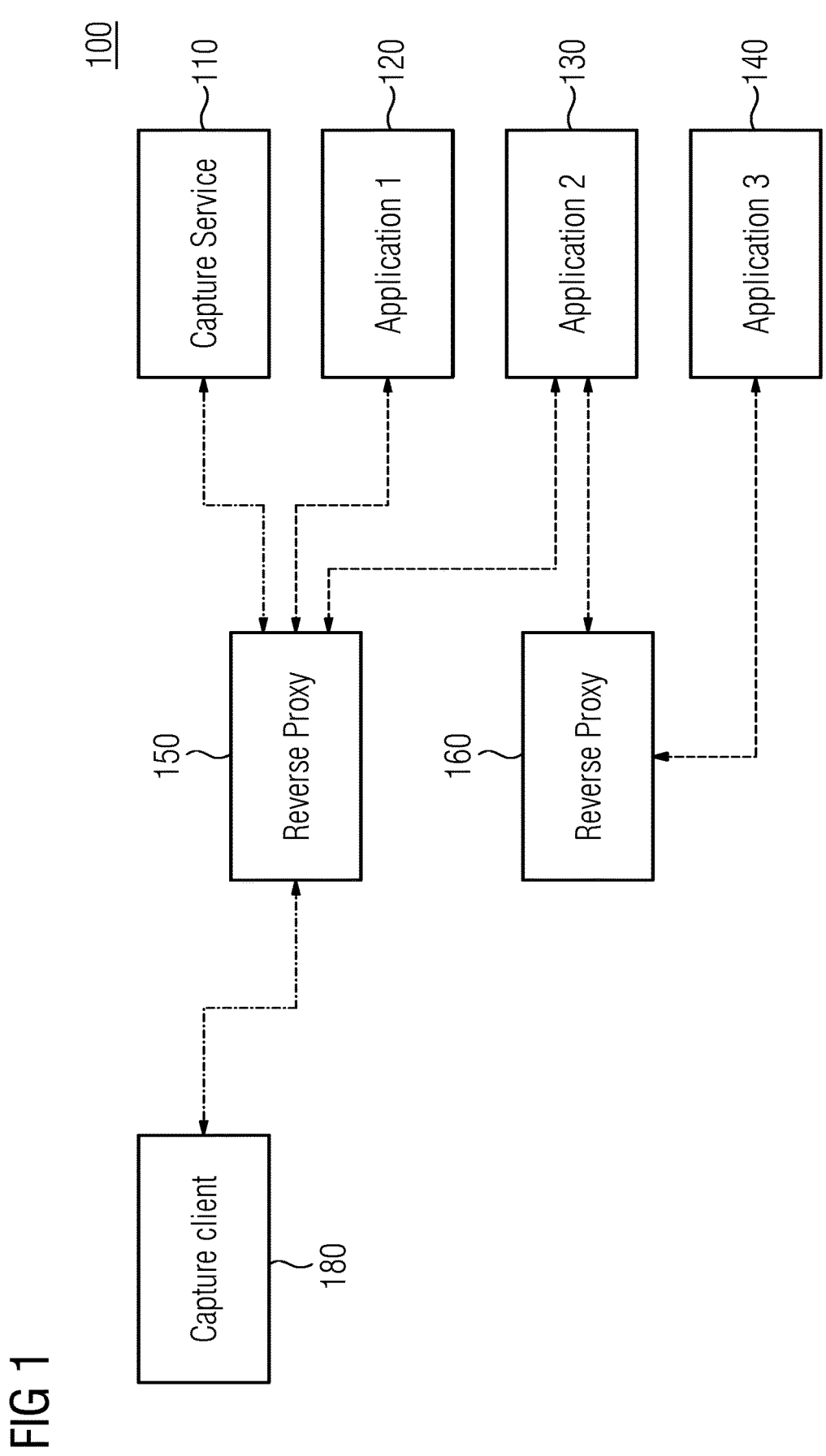
FIG. 1 depicts a section of an industrial facility including a packet capture service for capturing packets between two or more applications according to an embodiment.

FIG. 1 depicts a section of an industrial facility 100 including a plurality of applications (120, 130 and 140). Industrial facility herein refers to any environment where one or more industrial processes such as manufacturing, refining, smelting, or assembly of equipment, generation, transmission or distribution of electricity, transportation, may take place. This includes process plants, oil refineries, automobile factories, power plants, smart grids, electrical substations, storehouses, etc. The plurality of industrial process and operations may be carried out in production cells using a plurality of devices such as control devices, field devices, mobile devices, etc., present with the corresponding production cell. The control devices include process controllers, programmable logic controllers, supervisory controllers, automated guided vehicles, robots, operator devices, etc. One or more control devices are connected to a plurality of field devices (not shown in the figures) such as actuators and sensor devices for monitoring and controlling various industrial processes in the industrial facility. These field devices may include flowmeters, value actuators, temperature sensors, pressure sensors, etc. Additionally, the industrial facility includes a plurality of mobile devices (also referred to as mobile network devices) including one or more robots for performing a plurality of operations such as welding, assembly of parts; one or more autonomous guided vehicles for transportation and handling of material; one or more assets with RFID tags on conveyor belts, etc. in the industrial facility. Additionally, the industrial facility may include an operator station for displaying the status of the industrial facility to an operator and for allowing the operator to define KPIs for the control of the industrial processes in the facility. All the industrial devices may be connected to each other via a plant network (realized via wired and wireless technologies).

Communication in the above-mentioned plant network happens through wired and/or wireless technologies. Accordingly, the industrial facility utilizes the wireless communication network for enabling communication amongst the various devices of the industrial facility. The wireless network is based on cellular technology and includes a plurality of gateway devices or network devices. Gateway devices herein refers to one or more devices capable of connecting the user devices to the wireless network. Examples of gateway devices include base stations, routers, switches, relays, access points, etc. The plurality of gateway devices may include stationary gateway devices which may be affixed to a plurality of locations in the industrial facility. A plurality of the industrial devices in the facility are connected to one or more gateway devices to connect to the wireless network and for communicating information with the other devices and systems in the industrial facility. The industrial devices include the industrial applications that are capable of processing data from other industrial devices. The applications (120, 130 and 140) are hosted on one or more containers (not shown in the figure) and accordingly may be hosted in a container cluster. The applications may communicate with each other via one or more network/gateway devices present in the section 100. For example, application 120 is connected to the application 130 via the reverse proxy device 150. Similarly, application 130 is connected to the application 140 via the reverse proxy device 160.

Additionally, the section 100 includes a packet capture service 110 for capturing packets associated with the applications (120, 130 and 140). For capturing packets associated with the applications, the packet capture service is configured to listen and capture packets at the external network interfaces associated with the reverse proxy devices. As mentioned previously, this is done since certain communications between an application an industrial device and the automation devices outside the industrial device must be recorded in particular at the physical interfaces instead of the virtual network interface of the container associated with the application. Such recordings at the external or physical interfaces are always necessary in order to detect or exclude disturbances in the communication components responsible in an industrial edge. In addition, some applications must be connected directly at the level of the data link layer to plant networks- and thus to the external interfaces-because they have to speak non-IP-based automation protocols when communicating with automation devices.

Additionally, the packet capture service 110 is connected to one or more packet capture clients (shown in FIG. 1 as packet capture client 180). The packet capture service 110 is configured to receive capture request from a packet capture client, process the capture request, start a capture session in response to the capture request and transmit the captured packets to the packet capture client. However, in order ensure that the packet capture service 110 does not record the packets transmitted to the packet capture clients or packets already captured by an existing capture session, the packet capture service 110 is configured to process the capture request. Based on the processing, the packet capture service 110 determines if the capture session is to be created or not and if a filter is required in order to filter out certain packets from being captured. This is further explained in relation to FIG. 2.

Figure 2:
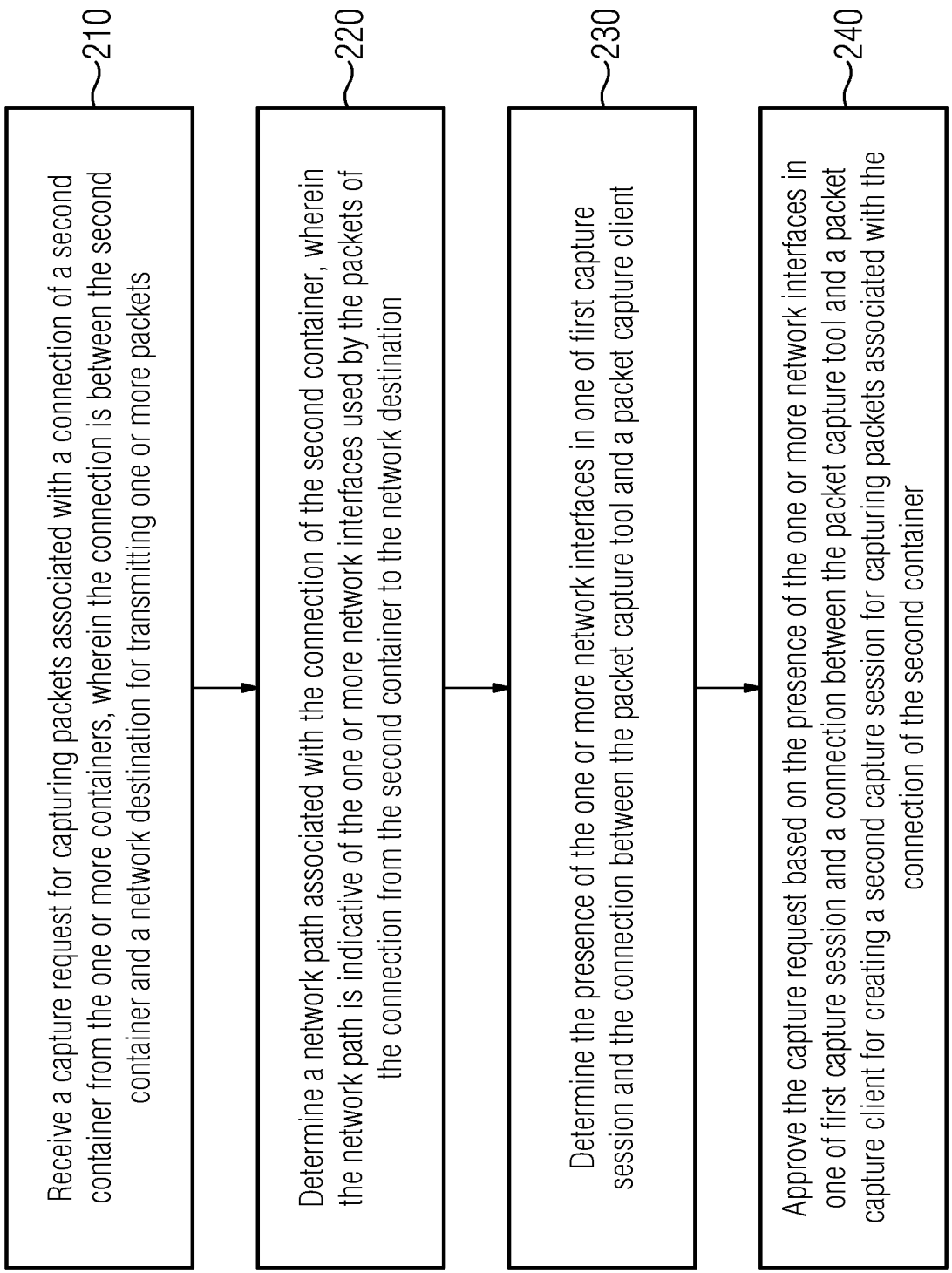
FIG. 2 depicts a method of capturing packets from one or more containers connected to one or more network interfaces in a section of the industrial network according to an embodiment.

FIG. 2 depicts a method 200 of capturing packets from one or more applications hosted on one or more containers connected to one or more network interfaces in the section of the industrial network 100. The method 200 is implemented by the packet capture service 110. The packet capture service 110 is capturing packets associated with a communication between application 130 and application 140 at a first network interface of the reverse proxy device 160.

At step 210, the packet capture service receives a capture request for capturing packets associated with a connection of a second container from the one or more containers. The connection is between the second container and a network destination for transmitting one or more packets. In an example, the second container is associated with the application 120 and the network destination is the container associated with the application 130. The capture request is transmitted by the packet capture client 180.

At step 220, the packet capture service determines a network path associated with the connection of the second container. The network path is indicative of the one or more network interfaces used by the packets of the connection from the second container to the network destination. The network path associated with the connection of the second container is determined based on network information associated with the second container. In an example, the network information associated with the second container is determined by the packet capture service 110 using a network discovery and management service. In another example, the network information of the second container is included in the capture request from the packet capture client. Based on the network information, the packet capture service is configured to determine the network path using a network topology associated with the section of the industrial facility 100. Network topology herein refers to topological information of the network devices indicating the corresponding connections amongst the network devices. The network topology indicates the physical and virtual connections between devices along with the data flows possible between the devices. For example, for Linux devices, this include VETH network interface connection pair information. Accordingly, the network topology includes routing information, TCP/IP address configuration, and link layer information associated with the device in the network. Network topology additionally includes information on the network interfaces and their assignment to (virtual) IP stacks, assignment of the network interfaces to containers and their services, in particular the proxies and the capture service, the direct data link layer connections between network interfaces (in particular of type VETH and MACVLAN), the IP addresses assigned to the network interfaces, and the route information of the (virtual) IP stacks.

Network path herein refers to the various network interfaces and network devices over which the connection between the second container and the network destination is established. Network interfaces includes both virtual and physical interfaces. For example, the network path between the second application associated with the application 120 and the network destination i.e. the container associated with the application 130 includes the network interfaces (virtual and real) of the second container on which the packets associated with the application 120 are transmitted/received, the network interfaces of the reverse proxy device 150 (which acts as an intermediate network device between the second container and the network destination), and the network interfaces (virtual and real) of the network destination on which the packets associated with the application 120 are transmitted/received.

For calculating the network path, the packet capture service determines the starting point of the path (212), that is: the (external) network interface, using the packet capture client's IP address and IP route tables to determine the incoming external network interface. Then, the packet capture service determines the end of the first path segment at the reverse proxy device RPR using the route table and IP addresses of the reverse proxy device. In additional reverse proxy devices are used, the packet capture service iteratively performs the above step to determine the network interfaces till the path terminates at the packet capture service. Accordingly, the packet capture service determines path segments based on the IP addresses recorded in web socket/HTTP headers mentioned in the capture request. Additionally, the packet capture service also records the TCP ports used along the path, as the individual segments are determined. An example network path is shown below: segment #1: from external ETH "ens33" with IP: port 1.2.3.4:443 to RPR's ETH "eth0" with 172.17.1.1:443, includes layer 2 interfaces "ens33", "docker0", "veth1234", "eth0"; and segment #2: from RPR's "eth1" with 172.17.6.66:12345 to CS' "eth0" with 172.17.6.99:5001, includes layer 2 interfaces "eth1", "vethabcd", "br-6667", "vethxyzz", "eth0".

Then, at step 230, the packet capture service determines the presence of the one or more network interfaces in one of first capture session and the connection between the packet capture service and a packet capture client. Based on the network path associated with the second container, the packet capture service determines if there is any overlap in the determined network path and the first capture session or the connection with the packet capture client. The packet capture service is configured to determine the network interfaces associated with the packet capture client and the packet capture service. Similar to determination of the network path mentioned above, the packet capture service is configured to obtain network information associated with the packet capture client (from either a network discovery service or from the packet capture client itself) and based on the network information and the network topology, the packet capture service determines the network interfaces used in the connection between the packet capture client and the packet capture service. Then, the packet capture service determines if there is one or more network interfaces which is present in both the network path between the second container and the network destination, and the connection between the packet capture client and the packet capture service. Similarly, the packet capture service includes a network path for the first capture session which includes the network interfaces associated with the communication between application 130 and application 140, i.e., the network interfaces of the containers of the applications 130 and 140, and the first network interface of the reverse proxy device 160. The packet capture service determines if there is one or more network interfaces that is present in both the network path between the second container and the network destination, and the network path of the first capture session.

At step 240, the packet capture service approves the capture request based on the presence of the one or more network interfaces in one of first capture session and a connection between the packet capture service and a packet capture client for creating a second capture session for capturing packets associated with the connection of the second container. In a first example, the capture request is approved when the one or more network interfaces in the network path of the second connection are not present in the first capture session and the connection between the packet capture service and the packet capture client. Accordingly, when there is not overlap of network interfaces, the packet capture service determines that there is no likelihood of self-recording and accordingly, the capture request is approved.

In second example, the method 200 further includes generating, by the packet capture service, a filter related to the capture request for capturing packets associated with the connection of the second container prior to approval of the capture request. When at least one network interface from the one or more network interfaces is present in the first capture session or the connection between the packet capture service and the packet capture client, the packet capture service is configured to setup a filter including one or more filter expressions for filtering one or more of packets associated with the first capture session and packets originating from the packet capture service. Subsequent to the successful deployment of the generated filter, the packet capture service approves the capture request since the generated filter eliminates self-recording by the packet capture service. However, prior to generation of the filter, the packet capture service is configured to determine if there is already a filter associated with the overlapping network interfaces, and accordingly, if there is a filter already, the packet capture service does not generate the filter. In an example, the packet capture service does not approve the capture request since it may not be possible to deploy two filters in relation to the same network interface. In another example, the existing filter is amended to eliminate self-recording in case the capture request is approved. The aspect of the filter is explained below using an example.

In an example, as mentioned above, the packet capture service 110 is connected to the packet capture client via a reverse proxy device over a first network interface of the reverse proxy device 150. The packet capture client has the IP address 1.2.3.4 and is connected to the reverse proxy device 150 via the TCP port 55555. The first network interface of the reverse proxy device 150 has the IP address 192.168.1.2 and is connected over TCP port 80 to the packet capture client. Similarly, the packet capture service has the IP address 1.1.3.4 and is connected to the reverse proxy device 150 via the first network interface at TCP port 49456.

The packet capture service 110 receive the capture request for capturing packets between the applications 120 and 130 which are connected via the reverse proxy device 150 via a second network interface of the reverse proxy device 150. The second network interface of the reverse proxy device 150 has the IP address 172.17.2.1 and is connected to the applications 120 and 130 over TCP ports 49987 and TCP port 49123. The capture request specifies that packet capture should take place at down the first and second interfaces of the reverse proxy device 150. Since the first network interface is present in the connection between the packet capture client and the packet capture service, the packet capture service generates and deploys a filter prior to the approval of the capture request. The filter contains an expression with a 'not' operator to exclude packets containing a combination of (IP address and port address) 1.2.3.4:55555 and 192.168.1.2:80 where either of the IP address and port address may be present in packet source or packet destination. Accordingly, the filter excludes recording of all packets originating at the packet capture client and is sent to the reverse proxy device 150 and all packets transmitted from the reverse proxy device and transmitted to the packet capture client.

In an example, the packet capture service includes a path finder module which is used in determining the network path as mentioned above. In an example, for determining the network interfaces used in the connection between the packet capture client and the packet capture service, the packet capture client and each reverse proxy device is configured to write the corresponding network information into the capture request. This information along with the network topology is used to determine the network interfaces used between the packet capture service and the packet capture client. In an example, the packet capture service includes a filter generator module for generating the filter as mentioned above.

Accordingly, the current disclosure describes a method to ensure packet capture is not inflated due to the use of HTTP proxies and servers while being able to utilize packets with standardized headers which only provide path information from the network level (layer 3 of the ISO/OSI layer model) upwards. By combining the standardized available path information with topology information of the various layers of the network, the likelihood of self-recording is eliminated. Accordingly, a new recording is only started if the network interfaces to be recorded are not located on any of the previous paths (or sections) of active capture sessions, or if the network interfaces to be recorded are not on the path of communication with the packet capture client.

Figure 3:
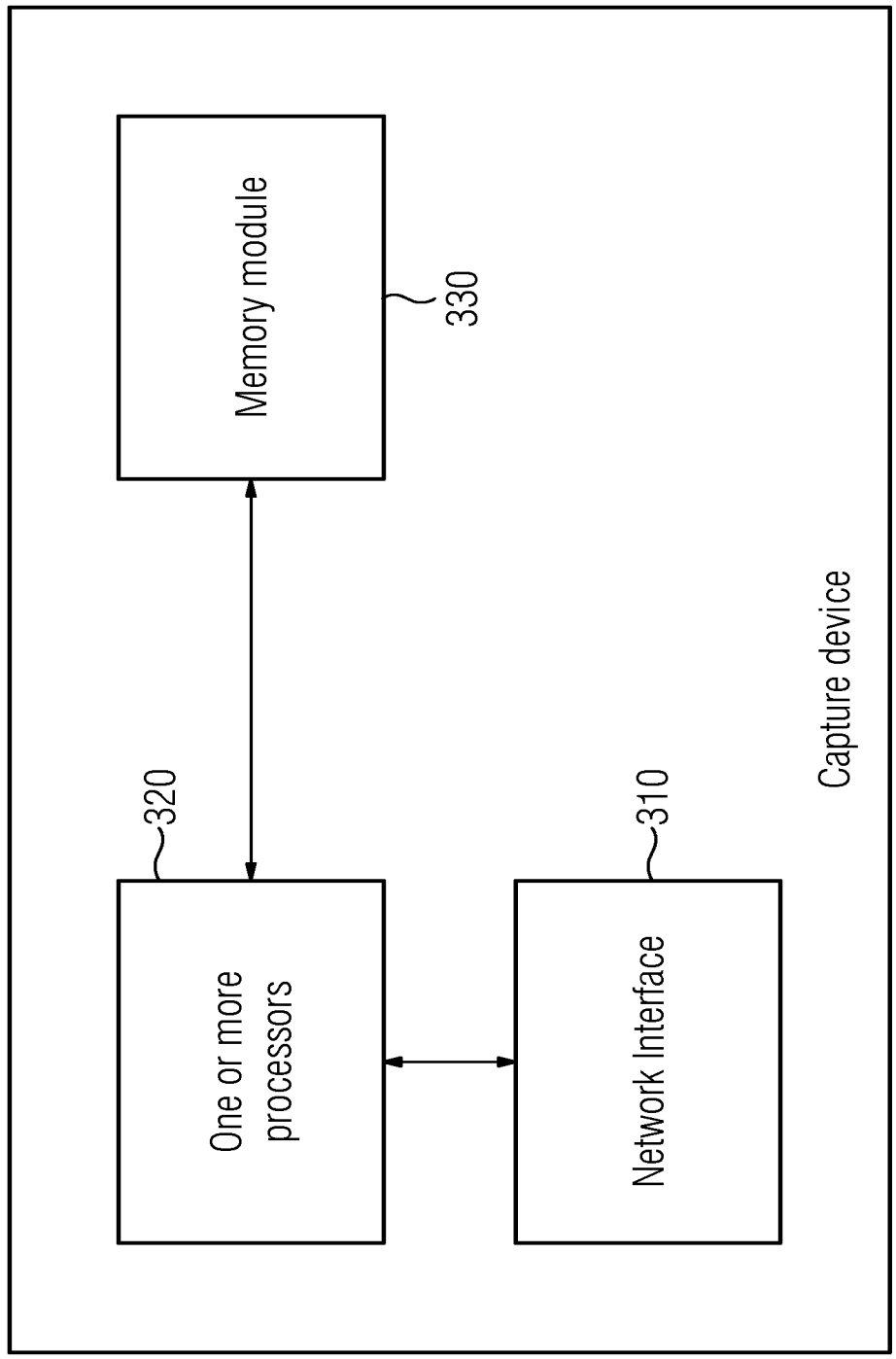
FIG. 3 depicts a packet capture device for capturing packets from one or more containers connected to one or more network interfaces in a section of the industrial network according to an embodiment.

Additionally, while the above method 200 has been explained in relation to packet capture service, the method 200 may be realized using one or more devices. For example, the method 200 may be realized via a packet capture device 300 as shown in FIG. 3.

The packet capture device 300 includes a network interface 310 for transmitting and receiving packets, and one or more processors 320. The one or more processors 320 is connected to a memory module 330 which includes a plurality of instructions which when executed on the one or more processors, cause the processors to receive a capture request for capturing packets associated with a connection of a second container from the one or more containers, wherein the connection is between the second container and a network destination for transmitting one or more packets; determine a network path associated with the connection of the second container, wherein the network path is indicative of the one or more network interfaces used by the packets of the connection from the second container to the network destination; determine the presence of the one or more network interfaces in one of first capture session and the connection between the packet capture service and a packet capture client; and approve the capture request based on the presence of the one or more network interfaces in one of first capture session and a connection between the packet capture service and a packet capture client for creating a second capture session for capturing packets associated with the connection of the second container.

It is to be noted that while the above disclosure has explained in relation to the packet capture device, the above method may be realized in another device or a plurality of devices. For example, the method 200 may be implemented in an edge server. Embodiments may provide a computer program product including program modules accessible from computer-usable or computer-readable medium storing program code for use by or in connection with one or more computers, processing units, or instruction execution system. For the purpose of this description, a computer-usable or computer-readable non-transitory storage medium may be any apparatus that may contain, store, communicate, propagate, or transport the program for use by or in connection with the instruction execution system, apparatus, or device. The medium may be electronic, magnetic, optical, electromagnetic, infrared, or semiconductor system (or apparatus or device) or a propagation mediums in and of themselves as signal carriers are not included in the definition of physical computer-readable medium include a semiconductor or solid state memory, magnetic tape, a removable computer diskette, random access memory (RAM), a read only memory (ROM), a rigid magnetic disk and optical disk such as compact disk read-only memory (CD-ROM), compact disk read/write, and DVD. Both processing units and program code for implementing each aspect of the technology may be centralized or distributed (or a combination thereof) as known to those skilled in the art.

It is to be understood that the elements and features recited in the appended claims may be combined in different ways to produce new claims that likewise fall within the scope of the present embodiments. Thus, whereas the dependent claims appended below depend from only a single independent or dependent claim, it is to be understood that these dependent claims may, alternatively, be made to depend in the alternative from any preceding or following claim, whether independent or dependent, and that such new combinations are to be understood as forming a part of the present specification.

While the present embodiments have been described above by reference to various embodiments, it may be understood that many changes and modifications may be made to the described embodiments. It is therefore intended that the foregoing description be regarded as illustrative rather than limiting, and that it be understood that all equivalents and/or combinations of embodiments are intended to be included in this description.

The invention claimed is:

1. A method of capturing packets from one or more applications hosted on one or more containers connected to one or more network interfaces in a section of an industrial network, by a packet capture service wherein the packet capture service is connected to a packet capture client for transmitting the captured packets to the packet capture client, the method comprising:
receiving a capture request for capturing packets associated with a connection of a second container from the one or more containers, wherein the connection is between the second container and a network destination for transmitting one or more packets;
determining a network path associated with the connection of the second container, wherein the network path is indicative of the one or more network interfaces used by the packets of the connection from the second container to the network destination;
determining a presence of the one or more network interfaces in one of a first capture session and the connection between the packet capture service and the packet capture client, wherein the first capture session is for capturing packets associated with a first container, wherein at least one network interface from the one or more network interfaces is present in one of a network path of the first capture session and the connection between the packet capture service and the packet capture client;
generating a filter related to the capture request for capturing packets associated with the connection of the second container, wherein the filter comprises one or more filter expressions for filtering one or more of packets associated with the first capture session and packets originating from or transmitted to the packet capture service; and
approving the capture request for creating a second capture session for capturing packets associated with the connection of the second container.

2. The method of claim 1, wherein approving the capture request comprises detecting a presence of another filter in relation to the one or more network interfaces, wherein the capture request is not approved when the another filter is detected.

3. The method of claim 1, wherein the capture request is transmitted by the packet capture client and the capture request comprises network information associated with the packet capture client.

4. The method of claim 1, wherein the capture request comprises network information associated with the second container and wherein determining the network path comprising determining one or more intermediate network interfaces based on the network information associated with the second container and a network topology associated the section of industrial network.

5. The method of claim 1, wherein the method further comprises:
determining a first set of network interfaces used in the connection between the packet capture service and the packet capture client based on network information of the packet capture client and a network topology associated with the section of the industrial network.

6. The method of claim 4, wherein the one or more intermediate network interfaces belong to at least one reverse proxy device.

7. The method of claim 5, wherein the network topology includes IP/TCP address configuration and IP route information of the one or more containers and the one or more network interfaces.

8. A packet capture device for of capturing packets from one or more applications hosted on one containers connected to one or more network interfaces in a section of an industrial network wherein the packet capture device is connected to a packet capture client for transmitting the captured packets to the packet capture client and includes a first capture session capturing packets associated with a first container, the packet capture device comprising:
one or more processors configured to:

receive a capture request for capturing packets associated with a connection of a second container from the one or more containers, wherein the connection is between the second container and a network destination for transmitting one or more packets;

determine a network path associated with the connection of the second container, wherein the network path is indicative of the one or more network interfaces used by the packets of the connection from the second container to the network destination;

determine a presence of the one or more network interfaces in one of first capture session and the connection between a packet capture service and a packet capture client;

generate a filter related to the capture request for capturing packets associated with the connection of the second container, when at least one network interface from the one or more network interfaces is present in the first capture session and the connection between the packet capture service and the packet capture client, wherein the filter comprises one or more filter expressions for filtering one or more of packets associated with the first capture session and packets originating from or transmitted to the packet capture service; and approve the capture request based on the presence of the one or more network interfaces in one of first capture session and a connection between the packet capture service and a packet capture client for creating a second capture session for capturing packets associated with the connection of the second container.

9. The packet capture device of claim 8, wherein approving the capture request comprises detecting a presence of another filter in relation to the one or more network interfaces, wherein the capture request is not approved when the another filter is detected.

10. The packet capture device of claim 8, wherein the capture request is transmitted by the packet capture client and the capture request comprises network information associated with the packet capture client.

11. The packet capture device of claim 8, wherein the capture request comprises network information associated with the second container and wherein determining the network path comprising determining one or more intermediate network interfaces based on the network information associated with the second container and a network topology associated the section of industrial network.

12. The packet capture device of claim 8, wherein the one or more processors are further configured to:
 determine a first set of network interfaces used in the connection between the packet capture service and the packet capture client based on network information of the packet capture client and a network topology associated with the section of the industrial network.

13. The packet capture device of claim 11, wherein the one or more intermediate network interfaces belong to at least one reverse proxy device.

14. The packet capture device of claim 12, wherein the network topology includes IP/TCP address configuration and IP route information of the one or more containers and the one or more network interfaces.

* * * * *